US011245703B2

(12) United States Patent
Egbert et al.

(10) Patent No.: US 11,245,703 B2
(45) Date of Patent: Feb. 8, 2022

(54) SECURITY TOOL FOR CONSIDERING MULTIPLE SECURITY CONTEXTS

(71) Applicant: BANK OF AMERICA CORPORATION, Charlotte, NC (US)

(72) Inventors: Jennie Kathleen Egbert, Charlotte, NC (US); Rajesh M. Gopinathapai, Aurora, IL (US); Jennifer Mae Walsh, Fort Mill, SC (US); Mary Adelina Quigley, Indian Trail, NC (US); Christopher James Stott, Charlotte, NC (US); Ruoping Shen, Chicago, IL (US); Kimberly J. Nowell-Berry, Palm City, FL (US)

(73) Assignee: Bank of America Corporation, Charlotte, NC (US)

( * ) Notice: Subject to any disclaimer, the term of this patent is extended or adjusted under 35 U.S.C. 154(b) by 285 days.

(21) Appl. No.: 16/585,752

(22) Filed: Sep. 27, 2019

(65) Prior Publication Data
US 2021/0099455 A1 Apr. 1, 2021

(51) Int. Cl.
*H04L 29/06* (2006.01)

(52) U.S. Cl.
CPC ............ *H04L 63/102* (2013.01); *H04L 63/20* (2013.01)

(58) Field of Classification Search
CPC .............................. H04L 63/102; H04L 63/20
USPC ............................................................ 726/4
See application file for complete search history.

(56) References Cited

U.S. PATENT DOCUMENTS

| | | |
|---|---|---|
| 5,237,614 A | 8/1993 | Weiss |
| 5,414,833 A | 5/1995 | Hershey et al. |
| 5,828,832 A | 10/1998 | Holden et al. |
| 5,940,591 A | 8/1999 | Boyle et al. |
| 6,052,788 A | 4/2000 | Wesinger, Jr. et al. |
| 6,070,244 A | 5/2000 | Orchier et al. |
| 6,134,591 A | 10/2000 | Nickles |
| 6,212,635 B1 | 4/2001 | Reardon |
| 6,301,668 B1 | 10/2001 | Gleichauf et al. |
| 6,304,975 B1 | 10/2001 | Shipley |
| 6,397,336 B2 | 5/2002 | Leppek |
| 6,453,345 B2 | 9/2002 | Trcka et al. |
| 6,484,261 B1 | 11/2002 | Wiegel |
| 6,678,827 B1 | 1/2004 | Rothermel et al. |
| 6,738,908 B1 | 5/2004 | Bonn et al. |
| 6,816,973 B1 | 11/2004 | Gleichauf et al. |
| 6,826,698 B1 | 11/2004 | Minkin et al. |
| 6,898,632 B2 | 5/2005 | Gordy et al. |

(Continued)

*Primary Examiner* — Anthony D Brown

(57) ABSTRACT

An apparatus includes a memory and a hardware processor. The memory stores a first profile and a first hash. The processor receives a first message indicating that the user has entered a building and updates the first profile to produce a second profile. The processor generates a second hash, calculates a first deviation between the second hash and the first hash, and determines that the first deviation is below a threshold. The processor receives a second message indicating that the user has requested access to a software application and updates the second profile to produce a third profile. The processor also generates a third hash, calculates a second deviation between the third hash and the first hash, determines that the second deviation is above the threshold, and in response, flags the user for increased security monitoring and denies the user access to the software application.

20 Claims, 5 Drawing Sheets

(56) References Cited

U.S. PATENT DOCUMENTS

| | | |
|---|---|---|
| 6,915,437 B2 | 7/2005 | Swander et al. |
| 7,032,242 B1 | 4/2006 | Grabelsky et al. |
| 7,058,358 B2 | 6/2006 | Cannon et al. |
| 7,086,089 B2 | 8/2006 | Hrastar et al. |
| 7,100,054 B2 | 8/2006 | Wenisch et al. |
| 7,174,563 B1 | 2/2007 | Brownlie et al. |
| 7,194,769 B2 | 3/2007 | Lippmann et al. |
| 7,249,187 B2 | 7/2007 | Sobel et al. |
| 7,249,374 B1 | 7/2007 | Lear et al. |
| 7,315,801 B1 | 1/2008 | Dowd et al. |
| 7,325,252 B2 | 1/2008 | Bunker, V. et al. |
| 7,346,922 B2 | 3/2008 | Miliefsky |
| 7,467,408 B1 | 12/2008 | O'Toole, Jr. |
| 7,475,137 B2 | 1/2009 | Holden et al. |
| 7,483,972 B2 | 1/2009 | Bhattacharya et al. |
| 7,644,365 B2 | 1/2010 | Bhattacharya et al. |
| 7,724,717 B2 | 5/2010 | Porras et al. |
| 7,735,114 B2 | 6/2010 | Kwan et al. |
| 8,001,594 B2 | 8/2011 | Heintz et al. |
| 8,201,257 B1 | 6/2012 | Andres et al. |
| 8,230,480 B2 | 7/2012 | Fazal et al. |
| 8,291,258 B2 | 10/2012 | Narayanaswamy et al. |
| 8,424,094 B2 | 4/2013 | Neystadt et al. |
| 8,572,717 B2 | 10/2013 | Narayanaswamy |
| 8,925,095 B2 | 12/2014 | Herz et al. |
| 9,215,244 B2 | 12/2015 | Ayyagari et al. |
| 9,747,444 B1 | 8/2017 | Touboul |
| 2019/0334724 A1* | 10/2019 | Anton ............... H04L 63/102 |

\* cited by examiner

SECURITY TOOL FOR CONSIDERING MULTIPLE SECURITY CONTEXTS

TECHNICAL FIELD

This disclosure relates generally to security.

BACKGROUND

Malicious users jeopardize the security of buildings, devices, and networks.

SUMMARY OF THE DISCLOSURE

Malicious users jeopardize the security of buildings, devices, and networks. These users may attempt to access buildings, devices, and networks to sabotage systems, install malware, and/or take personal information of other users. The personal and financial costs resulting from these security breaches can be quite high for organizations and individuals.

Various security measures have been implemented in existing buildings, devices, and networks to hinder or prevent breaches. However, these security measures are typically separate and/or isolated relative to each other. As a result, to successfully protect against a malicious user, all the security measures would need to successfully detect and stop that user in their isolated contexts. If even one security measure fails, the malicious user may gain access to an environment (e.g., building, device, or network) and damage that environment. Additionally, because these systems are separate from each other, a malicious user may behave in a way that each system finds suspicious but not suspicious enough to trigger an alert in each system. As a result, the user may be able to get away with malicious behavior.

This disclosure contemplates a security tool that improves security by generally detecting deviations from expected user behavior across different contexts. The security tool maintains a hash indicating expected or approved behavior. Each time a user performs some action (e.g., enters a building, logs on to a network, turns on a device), a profile for the user is updated to indicate the action that was performed. A hash of the profile is then generated and compared to the hash indicating expected or approved behavior. If the deviation between the two hashes is sufficiently large, then appropriate action may be taken. For example, the user may be flagged for further review. As another example, the user may be prevented from accessing a building. As yet another example, the user may be kicked off a network, restricted from accessing certain applications, and/or prevented from using a particular device. In this manner, the security tool can consider the actions of a user across different security contexts to determine whether the user is a malicious user, which makes it more difficult for a malicious user to trick the security system into granting access to certain environments.

According to an embodiment, an apparatus includes a memory and a hardware processor. The memory stores a first profile indicating actions taken by a user and a first hash indicating expected behavior from the user. The processor receives a first message indicating that the user has entered a building and updates the first profile based on the first message to produce a second profile. The processor generates a second hash based on the second profile, calculates a first deviation between the second hash and the first hash, and determines that the first deviation is below a threshold. The processor receives a second message indicating that the user has requested access to a software application and updates the second profile based on the second message to produce a third profile. The processor also generates a third hash based on the third profile, calculates a second deviation between the third hash and the first hash, determines that the second deviation is above the threshold, and in response to determining that the second deviation is above the threshold, flags the user for increased security monitoring and denies the user access to the software application.

According to another embodiment, a method includes storing, by a memory, a first profile indicating actions taken by a user and storing, by the memory, a first hash indicating expected behavior from the user. The method further includes receiving, by a hardware processor communicatively coupled to the memory, a first message indicating that the user has entered a building and updating, by the hardware processor, the first profile based on the first message to produce a second profile. The method also includes generating, by the processor, a second hash based on the second profile, calculating, by the processor, a first deviation between the second hash and the first hash, and determining, by the processor, that the first deviation is below a threshold. The method further includes receiving, by the processor, a second message indicating that the user has requested access to a software application and updating, by the processor, the second profile based on the second message to produce a third profile. The method also includes generating, by the processor, a third hash based on the third profile, calculating, by the processor, a second deviation between the third hash and the first hash, determining, by the processor, that the second deviation is above the threshold, and in response to determining that the second deviation is above the threshold, flagging, by the processor, the user for increased security monitoring and denying, by the processor, the user access to the software application.

According to yet another embodiment, a system includes a building and a security tool including a memory and a hardware processor. The security tool stores a first profile indicating actions taken by a user and a first hash indicating expected behavior from the user. The security tool also receives a first message indicating that the user has entered the building and updates the first profile based on the first message to produce a second profile. The security tool further generates a second hash based on the second profile, calculates a first deviation between the second hash and the first hash, and determines that the first deviation is below a threshold. The security tool also receives a second message indicating that the user has requested access to a software application and updates the second profile based on the second message to produce a third profile. The security tool further generates a third hash based on the third profile, calculates a second deviation between the third hash and the first hash, determines that the second deviation is above the threshold, and in response to determining that the second deviation is above the threshold, flags the user for increased security monitoring and denies the user access to the software application.

Certain embodiments provide one or more technical advantages. For example, an embodiment improves security by preventing access to certain security contexts based on information from other security contexts. As another example, an embodiment protects user information by hashing a user's behavior in making security decisions. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 5 of the drawings, like numerals being used for like and corresponding parts of the various drawings.

Various security measures have been implemented in existing buildings, devices, and networks to hinder or prevent breaches. However, these security measures are typically separate and/or isolated relative to each other. As a result, to successfully protect against a malicious user, all the security measures would need to successfully detect and stop that user in their isolated contexts. If even one security measure fails, the malicious user may gain access to an environment (e.g., building, device, or network) and damage that environment. Additionally, because these systems are separate from each other, a malicious user may behave in a way that each system finds suspicious but not suspicious enough to trigger an alert in each system. As a result, the user may be able to get away with malicious behavior.

This disclosure contemplates a security tool that improves security by generally detecting deviations from expected user behavior across different contexts. The security tool maintains a hash indicating expected or approved behavior. Each time a user performs some action (e.g., enters a building, logs on to a network, turns on a device), a profile for the user is updated to indicate the action that was performed. A hash of the profile is then generated and compared to the hash indicating expected or approved behavior. If the deviation between the two hashes is sufficiently large, then appropriate action may be taken. For example, the user may be flagged for further review. As another example, the user may be prevented from accessing a building. As yet another example, the user may be kicked off a network, restricted from accessing certain applications, and/or prevented from using a particular device. In this manner, the security tool can consider the actions of a user across different security contexts to determine whether the user is a malicious user, which makes it more difficult for a malicious user to trick the security system into granting access to certain environments. The security tool will be described in more detail using FIGS. 1 through 4.

Figure 1:
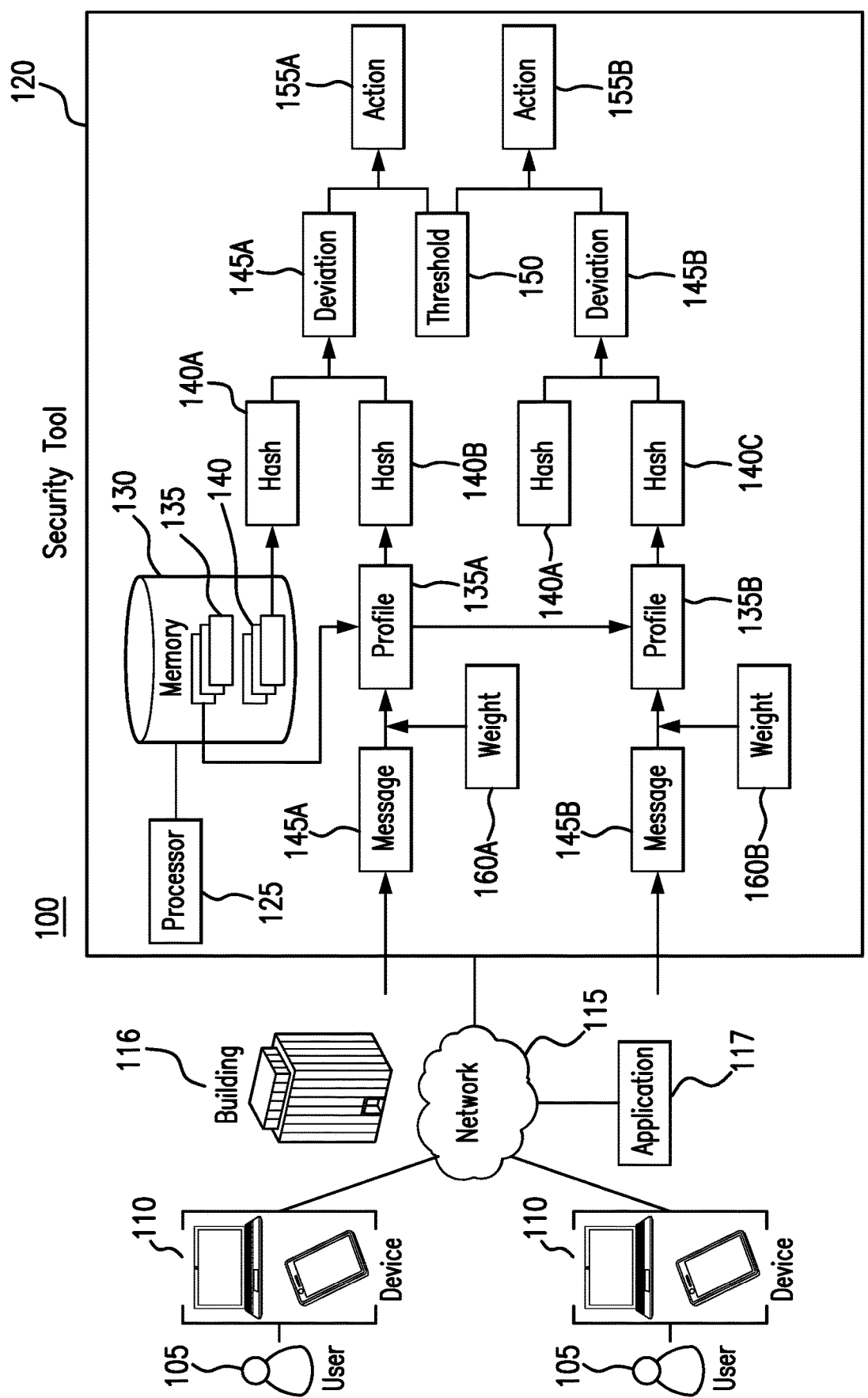
FIG. 1 illustrates an example system.

FIG. 1 illustrates an example system 100. As seen in FIG. 1, system 100 includes one or more devices 110, a network 115, a building 116, a software application 117, and a security tool 120. Generally, system 100 protects various systems from malicious users by considering the behavior of user 105 in various security contexts. In this manner, the security of network 115, building 116, and/or other software applications is improved in certain embodiments.

Users 105 use devices 110 to interact with other components of system 100. For example, user 105 may use device 110 to access network 115. As another example, user 105 may use device 110 to access or enter building 116. As yet another example, user 105 may use device 110 to access and/or execute various software applications 117. This disclosure contemplates user 105 using device 110 to perform any suitable action within system 100. A malicious user may use device 110 to access components of system 100 that the malicious user should not be accessing. For example, the malicious user may impersonate a legitimate user 105 by spoofing a device 110 of the legitimate user 105. The malicious user may then use the spoofed device to access building 116, network 115, and/or other software applications 117 that the malicious user may not otherwise be able to access. The malicious user may then damage certain components of system 100. Such as, for example, sabotaging hardware components in building 116 and/or installing malware on network 115.

Devices 110 include any appropriate device for communicating with components of system 100 over network 115. For example, devices 110 may be a telephone, a mobile phone, a computer, a laptop, a tablet, an automated assistant, and/or a cash register. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 allows communication between and amongst the various components of system 100. For example, user 105 may use devices 110 to communicate over network 115. A malicious user may jeopardize the security of network 115, such as, for example, by installing malware on network 115. A security system may be placed on network 115 to prevent access by a malicious user. However, if a malicious user were to impersonate a legitimate user, the malicious user may gain access to network 115 and damage network 115. Although the malicious user may access network 115 in a suspicious manner (e.g., by logging on when users are typically asleep and/or by logging on through an unsecured connection), this behavior may not be sufficient to trigger an alert in the security system installed on network 115. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Building 116 may be a physical structure that houses components of system 100. For example, building 116 may house hardware components that implement network 115, devices 110, and/or security tool 120. Users 105 may access building 116 using devices 110. For example, users 105 may present security credentials on device 110 and be given access to building 116. If a malicious user were granted access to building 116, the malicious user may damage and/or sabotage the physical units housed within building 116. Security systems that control access to building 116 may be installed to help prevent a malicious user from accessing building 116. However, if a malicious user were to impersonate a legitimate user, then the malicious user may be granted access to building 116. Although the malicious user may access building 116 in a suspicious manner (e.g., by entering building 116 on a weekend and/or by using a back door to enter building 116), this behavior may not be enough to trigger an alert in the building's 116 security system.

The malicious user may also access software applications 117 to inflict damage on other systems. Although the malicious user access and behavior on these software applications 117 may be suspicious (e.g., requesting access to an application that a legitimate user typically does not access and/or by performing functions that a legitimate user typically would not perform), this behavior may not be sufficient to trigger any security that was installed to govern the access and behavior on these software applications.

In each of these examples, the malicious user may behave suspiciously but not suspicious enough to trigger an alert in each of the separate security systems installed in the building, the network, and at the software level. For example, the malicious user may enter building 116 through a door that a legitimate user would not typically use. As another example, the malicious user may log on to network 115 at the time when legitimate user typically does not log on to network 115. As yet another example, the malicious user may request access to a software application that a legitimate user typically does not access. Each of these actions would be evaluated by a separate security system but may not be enough for each security system to determine that the user is malicious. Thus, the malicious user may be able to avoid detection and inflict damage to the components of system 100. However, it may be the case that if the totality of the user's suspicious behavior were considered, then the user would be determined to be malicious.

This disclosure contemplates a security tool 120 that considers the behavior of a user 105 across different security contexts to determine whether the user is a malicious user and presents a security risk. If the user is a malicious user, security tool 120 can take remedial action (e.g., by preventing the user from accessing a building, kicking the user off a network, restricting access to certain software application, preventing a device of the user from accessing the network and/or applications). For example, security tool 120 may evaluate a user 105 who has (1) accessed building 116, (2) logged onto network 115 using a device 110, (3) requested access to an application 117, and (4) performed a function on device 110 and/or in application 117. As seen in FIG. 1, security tool 120 includes a processor 125 and a memory 130. This disclosure contemplates processor 125 and memory 130 being implemented to perform any of the functions of security tool 120 described herein. In certain embodiments, security tool 120 generates a holistic picture of the behavior of user 105 and system 100 to determine whether user 105 is a malicious user.

Processor 125 is any electronic circuitry, including, but not limited to microprocessors, application specific integrated circuits (ASIC), application specific instruction set processor (ASIP), and/or state machines, that communicatively couples to memory 130 and controls the operation of security tool 120. Processor 125 may be 8-bit, 16-bit, 32-bit, 64-bit or of any other suitable architecture. Processor 125 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 125 may include other hardware that operates software to control and process information. Processor 125 executes software stored on memory to perform any of the functions described herein. Processor 125 controls the operation and administration of security tool 120 by processing information received from devices 110, network 115, and memory 130. Processor 125 may be a programmable logic device, a microcontroller, a microprocessor, any suitable processing device, or any suitable combination of the preceding. Processor 125 is not limited to a single processing device and may encompass multiple processing devices.

Memory 130 may store, either permanently or temporarily, data, operational software, or other information for processor 125. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processor 125 to perform one or more of the functions described herein.

Security tool 120 stores one or more profiles 135. Each profile 135 indicates actions taken by a user 105 in system 100. For example, a profile 135 indicates a series of actions taken by a user 105. When that user 105 performs an additional action, that profile 135 is updated to include the newly performed action. For example, if a user 105 enters building 116, profile 135 may be updated to indicate that user 105 has accessed building 116. The profile 135 may also indicate the time and/or a door through which the user 105 accessed building 116. As another example, user 105 logs on to network 115, the profile 135 may be updated to indicate a time, a username, and a password used by user 105 to log onto network 115. As yet another example, when the user 105 requests access to a software application 117 or performs an action using the software application 117, the profile 135 may be updated to indicate the time and the action taken by the user 105 using the software application 117 such as, for example, the request or the function performed. Security tool 120 may process the profile 135 when an update occurs to evaluate whether the user 105 is a malicious user and should be prevented access to certain features or functions within system 100.

Security tool 120 stores one or more hashes 140. Each hash 140 indicates expected behavior from a user 105. The hashes 140 may be compared with other hashes 140 to determine whether a user 105 is a malicious user. By hashing the behavior of user 105, the identity and behavior of the user is protected. In other words, it may not be possible by looking at a particular hash 140 to determine which user 105 is described by the hash 140. Additionally, it may not be possible to determine the actual actions taken by the user 105. In this manner, hash 140 protects the identity and behavior of legitimate users 105. In the example of FIG. 1, hash 140A is a hash indicating the expected behavior of a certain user 105. When that user 105 performs an action in system 100, hash 140A is compared with another hash 140 that indicates the user's 105 action to determine whether the behavior is deviant.

Security tool 120 receives messages 145 that indicate the actions taken by user 105. In the example of FIG. 1, security tool 120 receives a message 145A indicating an action taken by user 105. For example, message 145A may indicate that user 105 has accessed building 116 or is attempting to access building 116. Messages 145A may further indicate that user 105 has accessed building 116 at a particular time through a particular door.

In certain embodiments, security tool 120 may apply a weight 160A to the action indicated by message 145A. If the action indicated by message 145A typically presents a threat to system 100, then weight 160A may be high. On the other hand, if the action indicated by message 145A is typically safe conduct, then weight 160A may be low. By using weight 160, security tool 120 may appropriately judge the actions taken by a user 105 to evaluate whether user 105 is a malicious user.

Security tool 120 updates profile 135 to indicate the action taken by user 105. In the example of FIG. 1, security tool 120 updates a profile 135 with the action indicated by message 145A to produce a profile 135A. Profile 135A may indicate the actions taken by user 105 and the action indicated by message 145A (e.g., that user 105 has accessed building 116 at a particular time, through a particular door). Security tool 120 may then evaluate profile 135A to determine if user 105 is a malicious user.

Security tool 120 hashes profile 135A to generate hash 140B. Security tool 120 compares hash 140B with hash 140A. As described above, hash 140A indicates expected behavior from user 105. Security tool 120 determines a deviation 145A between hash 140A and hash 140B. Deviation 145A may indicate whether user 105 is a malicious user. For example, if the behavior indicated by message 145A deviates from the expected behavior of user 105, then deviation 145A may indicate that user 105 is a malicious user. Using the previous example, if user 105 does not typically access building 116 at the time indicated by message 145A or if user 105 does not typically access building 116 through the door indicated my message 145A then deviation 145A may be large. On the other hand, if user 105 typically accesses building 116 at the time indicated by message 145A or if user 105 typically accesses building 116 through the door indicated by message 145A then deviation 145A may be small. As yet another example, if security tool 120 determines that accessing building 116 is not a significant indicator of whether user 105 is a malicious user, then weight 160A may be small thus resulting in deviation 145A being small even if user 105 accessing building 116 at a particular time, through a particular door, deviates from the typical behavior of user 105.

Security tool 120 compares deviations 145 to threshold 150 to determine whether a user 105 is a malicious user. For example, if deviation 145A exceeds threshold 150, then security tool 120 may determine that user 105 is a malicious user. In some embodiments, threshold 150 may be one standard deviation such that if deviation 145A deviates from expected behavior by one standard deviation, then security tool 120 determines that user 105 is a malicious user.

Security tool 120 determines action 155 to take in response to the comparison between deviation 145 and threshold 150. In the example of FIG. 1, security tool 120 determines an action 155A based on the comparison of deviation 145A and threshold 150. For example, if security tool 120 determines that deviation 145A exceeded threshold 150, then security tool 120 may determine that user 105 is a malicious user and that user 105 should be prevented from accessing building 116. Thus, action 155A may need to prevent user 105 from entering building 116. On the other hand, if deviation 145A does not exceed threshold 150, then security tool 120 may determine action 155A to allow the user 105 access to building 116.

Security tool 120 may continue monitoring the behavior of user 105 in different security contexts to determine whether user 105 is a malicious user. Security tool 120 receives a second message 145B indicating another action taken by user 105. For example, message 145B may indicate that user 105 has logged onto network 115 at a particular time using certain login credentials. As another example, message 145B may indicate that user 105 has requested access to a particular software application. As described previously, security tool 120 may apply a weight 160B to the action indicated by message 145B. Security tool 120 may update profile 135A with the action indicated by message 145B to produce profile 135B. Thus, profile 135B includes the action indicated by message 145A and the action indicated in message 145B. Security tool 120 then generates a hash 140C using profile 135B. Security tool 120 then compares hash 140C to hash 140A to determine deviation 145B. In this manner, security tool 120 considers the totality of the users 105 behavior in determining whether the user 105 is a malicious user.

Security tool 120 compares deviation 145B with threshold 150 to determine an action 155B. For example, if security tool 120 determines that deviation 145B exceeds threshold 150, then security tool 120 may determine that user 105 is a malicious user and prevent user 105 from accessing building 116, logging onto network 115, and using a requested software application.

In this manner, security tool 120 can prevent a malicious user from accessing system 100 when the user's 105 behavior across different security contexts deviates too much from expected behavior. Using the example of FIG. 1, deviation 145A may not exceed threshold 150 because access to building 116 may not be sufficient to indicate whether user 105 is a malicious user. Thus, action 155A may be to allow user 105 access to building 116. However, when user 105 logs onto network 115 and/or request access to a particular software application 117, then the behavior may deviate too far from the expected behavior of user 105. Thus, deviation 145B, which considered the user's access to building 116 along with the user's access to network 115 and the software application 117, may exceed threshold 150. Security tool 120 may take action 155B, which may be to trigger an alarm or an alert, and to prevent user 105 from accessing building 116, network 115, and/or the requested software application 117. Thus, security tool 120 considers the behavior of user 105 across the security of building 116, network 115, and/or software applications 117 to determine whether user 105 is a malicious user, thereby improving the security of system 100 in certain embodiments.

This disclosure contemplates security tool 120 performing any suitable action in response to determining that a deviation 145 exceeds threshold 150. For example, security tool 120 may flag a user 105 for increased security monitoring. Additionally, security tool 120 may deny user 105 access to other components of system 100, such as, for example, building 116, network 115, and/or application 117. Security tool 120 may also trigger an alarm that alerts other users 105 of the security breach.

Although FIG. 1 shows security tool 120 performing certain steps or taking certain actions in linearly or sequentially, this sequential illustration is provided merely for clarity. Security tool 120 need not perform steps serially or sequentially but can perform steps in parallel. As a result, security tool 120 can receive information from multiple sources and security contexts in parallel and process this information in parallel to make determinations about a user's behavior on the fly. For example, security tool 120 may receive a message 145 indicating that user 105 attempted to enter building 116 through a door and while processing that message 145, security tool 120 may receive another message indicating that the user 105 has requested access to a particular application 117. Security tool 120 may generate a hash 140 that captures both of these actions taken by the user 105 to determine the appropriate action 155 that should be taken.

Figure 2:
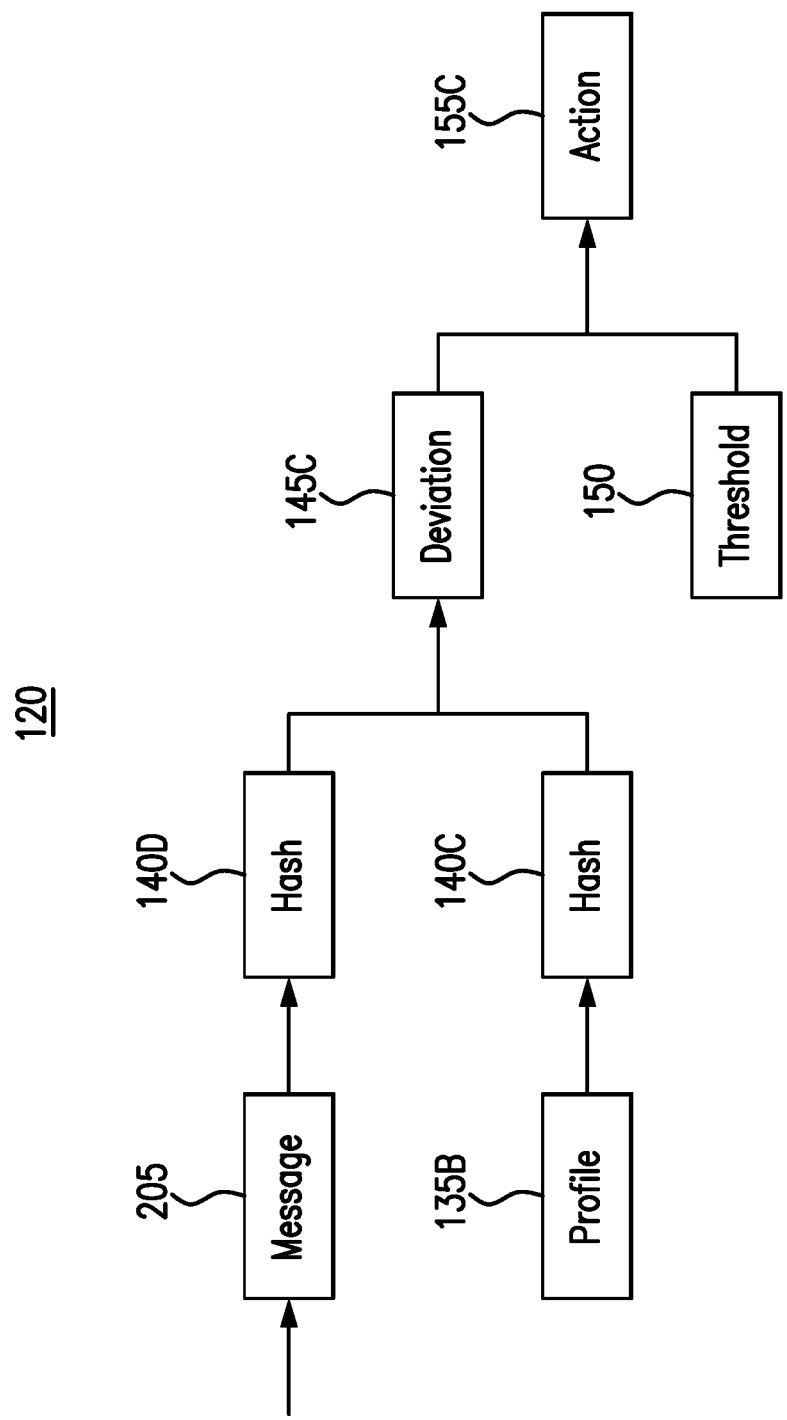
FIG. 2 illustrates an example security tool of the system of FIG. 1.

FIG. 2 illustrates an example security tool 120 of the system 100 of FIG. 1. In the example of FIG. 2, security tool 120 updates the hash 140 that indicates expected behavior. In this manner, security tool 120 may be updated to detect, allow, and/or prevent new behavior.

Security tool 120 receives a message 205 that indicates a certain action. Message 205 may indicate that the action should be allowed or not allowed. For example, message 205 may indicate that a user 105 should be given access to a building. As another example, message 205 may indicate that the user 105 should not be given access to a network or application.

Security tool 120 may update a hash 140 based on the message 205. Hash 140 may indicate expected behavior. Security tool 120 may update that hash 140 based on message 205 to produce hash 140D. Hash 140D may indicate the new expected behavior indicated by message 205. Security tool 120 may then use hash 140D to determine whether a user is a malicious user.

In the example of FIG. 2, security tool 120 generates a hash 140C from profile 130B. As described above, profile 130C and hash 140C may indicate the actions taken by a user 105 who has accessed a building 116, a network 115, and/or an application 117. Security tool 120 may compare hash 140C and hash 140D to determine a deviation 145C. Security tool 120 may then determine an action 155C by comparing deviation 145C with threshold 150.

Using the previous example, security tool 120 may have determined that a user was a malicious user based on the behavior indicated by profile 135B and hash 140C. For example, the user's behavior in accessing a building, network, and/or application may have deviated too much from expected behavior. In response, security tool 120 may have flagged the user, triggered an alarm, and/or prevented access to the building, network, and/or application. In the example of FIG. 2, security tool 120 may have received message 205 that indicates that the user is not a malicious user and should be granted access to the building, network, and/or application. In response, security tool 120 updates the hash 140 of expected behavior to produce hash 140D. Security tool 120 then reevaluates the user by comparing hash 140C to 140D to determine deviation 145C. Deviation 145C may not exceed threshold 150, and thus, security tool 120 may perform action 155C to allow the user access to the building, network, and/or application. In this manner, security tool 120 may be updated to consider and evaluate any behavior performed by a user in system 100.

Figure 3:
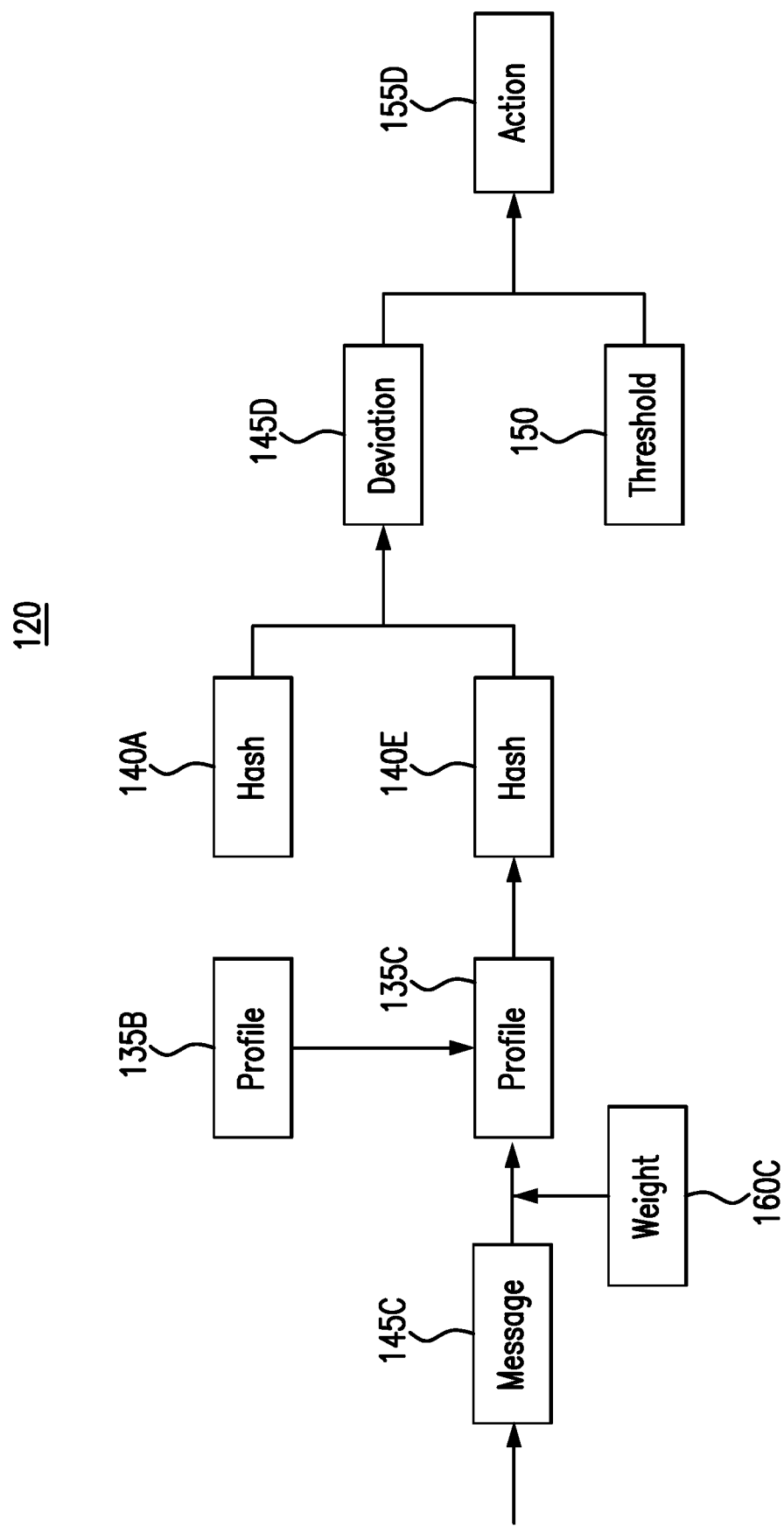
FIG. 3 illustrates an example security tool of the system of FIG. 1.

FIG. 3 illustrates an example security tool 120 of the system 100 of FIG. 1. Generally, FIG. 3 shows security tool 120 considering additional behavior performed by a user in system 100. Security tool 120 receives a message 145C indicating behavior performed by a user in system 100. Message 145C may indicate that the user has accessed a particular device in system 100. Security tool 120 applies a weight 160C to the action indicated by message 145C. Security tool 120 then updates profile 135B to include the behavior indicated by message 145C to produce profile 135C. In this manner, profile 135C indicates the user's access to a building, a network, an application, and/or a device.

Security tool 120 generates hash 140E from profile 135C. Security tool 120 then compares hash 140A and hash 140E to determine deviation 145D. If deviation 145D exceeds a threshold 150, security tool 120 may determine that the user is a malicious user. Security tool 120 may further prevent the device from connecting to the network. If deviation 145D does not exceed threshold 150, security tool 120 may determine that the user is not a malicious user. In response, security tool 120 takes an appropriate action 155D. If the user is a malicious user, action 155D may be to prevent the user from accessing the particular device. If the user is not a malicious user, then security tool 120 may allow the user access to the device.

In this manner, security tool 120 may continue evaluating the totality of the user's behavior in system 100 in determining whether the user is a malicious user even after an action 155 is taken.

Figure 4:
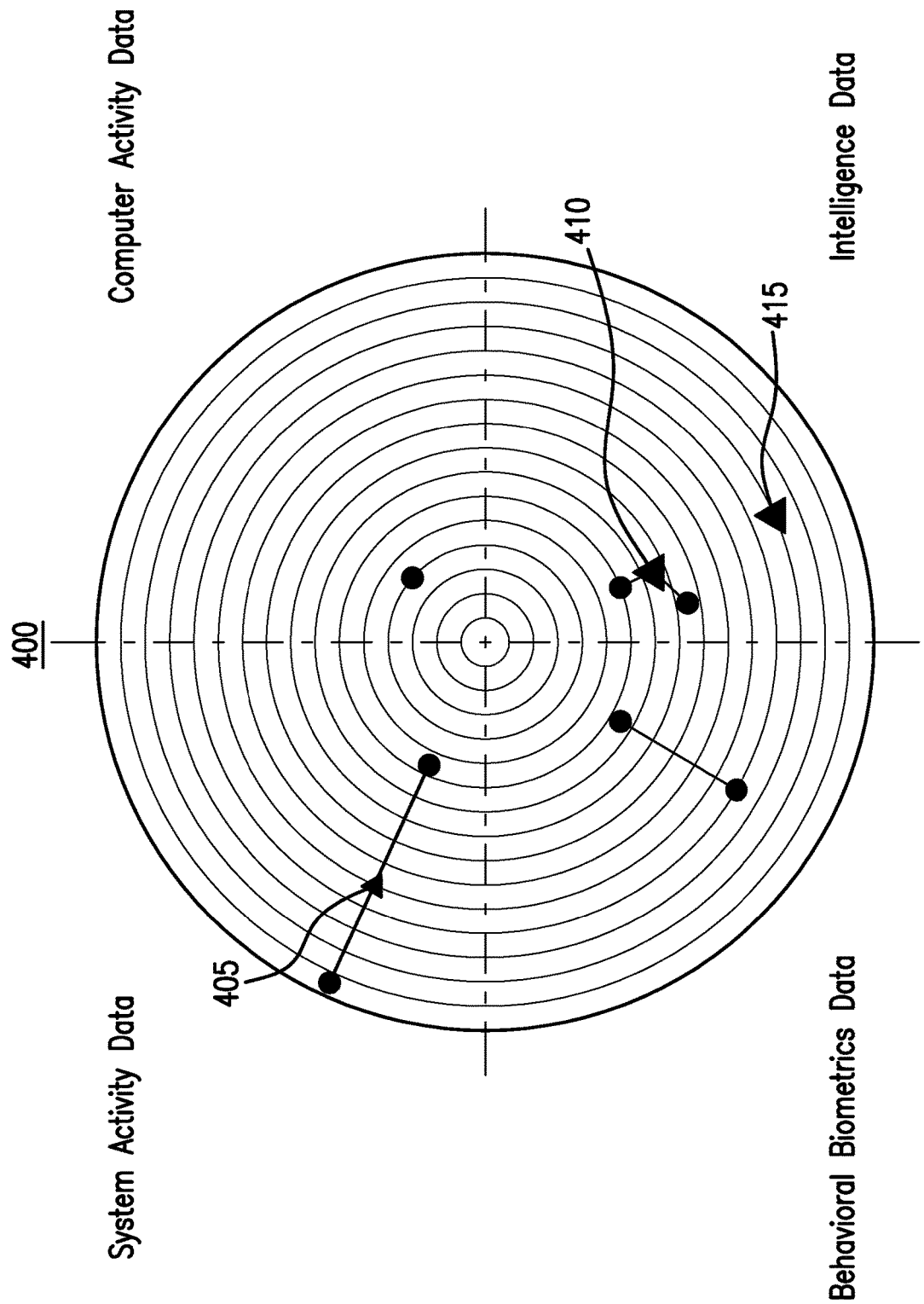
FIG. 4 shows a radial graph that illustrates an example operation of the security tool of the system of FIG. 1.

FIG. 4 shows a radial graph 400 that illustrates an example operation of the security tool of the system of FIG. 1. Radial graph 400 is divided into four regions representing information about four different types of actions taken by a user. The top left quadrant represents information about system activities. The top right quadrant represents information about computer activities. The bottom left quadrant represents information about behavioral biometrics activities. The bottom right quadrant represents information about intelligence activities.

The circular nodes in graph 400 represent the hash values for expected behavior. Certain points in a quadrant are connected by a line or lines to indicate an acceptable deviation from the accepted behavior. The triangular nodes in graph 400 indicate hash values for actions taken by a user. Thus, in the example of FIG. 4, the user has performed an action in the system activities category, such as for example, entering a building. That action is represented by triangular node 405. As seen in graph 400, that action falls within the range of expected behavior or does not deviate too far from expected behavior. Thus, that action may be allowed.

Triangular node 410 also indicates an acceptable action within the intelligence category. The action may be, for example, requesting access to an application. As seen in FIG. 4, node 410 falls within the range of expected behavior in that category or does not deviate too far from expected behavior in that category. Thus, the action represented by node 410 may be allowed. However, triangular node 415 does not fall within the range of expected behavior. For example, node 415 may represent the user requesting to access sensitive information through the application. As a result, appropriate action may be taken when node 415 is evaluated. For example, the system may prevent the user from accessing the sensitive information. Moreover, the system may stop the user from accessing the application or from entering the building even though those behaviors were previously found to be within the range of expected behavior.

Graph 400 may be updated as the user takes certain actions. For example, the circular nodes may move in graph 400 depending on updates received and actions taken by the user. Using the previous example, when the user requests access to the sensitive information (represented by node 415), the circular nodes in the system activity category and the intelligence category may shift such that triangular nodes 405 and 410 are no longer within the range of expected behavior. This shift represents the user being prevented from accessing the application and the building.

This disclosure contemplates graph 400 including any appropriate number of nodes representing any appropriate number of behaviors. The number of nodes shown in graph 400 in FIG. 4 is for illustrative purposes.

Figure 5:
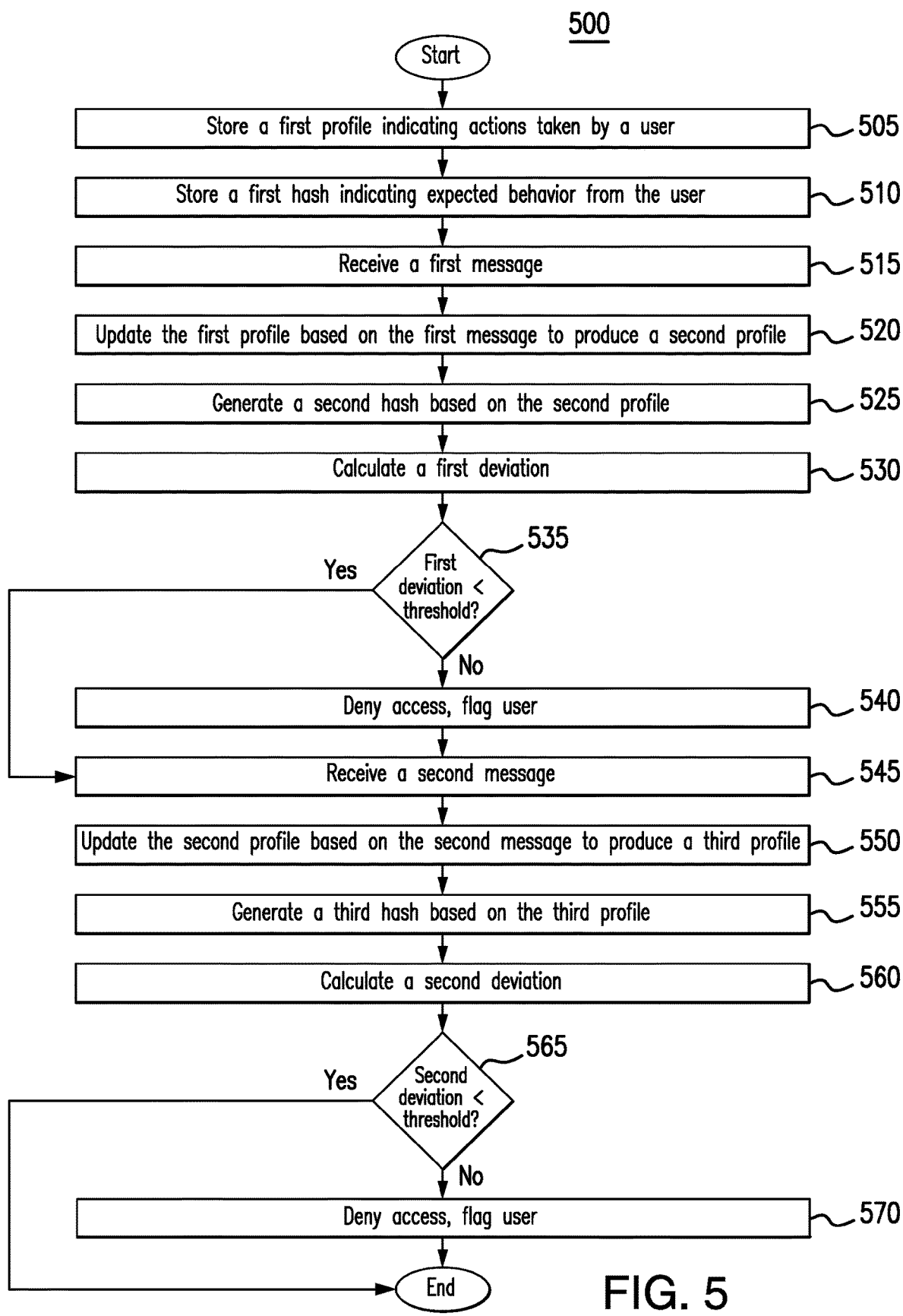
FIG. 5 is a flowchart illustrating a method for improving security using the system of FIG. 1.

FIG. 5 is a flowchart illustrating a method 500 for improving security using the system 100 of FIG. 1. In certain embodiments, security tool 120 performs the steps of method 500. By performing method 500, security tool 120 improves the security of the system, such as, for example, a building, a network, and/or an application.

In step 505, security tool 120 stores a first profile indicating actions taken by a user. Security tool 120 stores a first hash indicating expected behavior from the user in step 510. In step 515, security tool 120 receives a first message. The first message indicates a certain action or behavior taken by the user. Security tool 120 updates the first profile based on the first message to produce a second profile in step 520. The second profile includes the action indicated by the first message. In step 525, security tool 120 generates a second hash based on the second profile. Security tool 120 calculates a first deviation in step 530 by comparing the second hash with the first hash.

Security tool 120 determines whether the first deviation exceeds the threshold in step 535. If the first deviation exceeds the threshold, security tool 120 may determine that the user is a malicious user, and in step 540, flag the user for additional security monitoring and deny the user access to certain components of the system, such as a building, a network, and/or a software application. If the first deviation does not exceed the threshold, then security tool 120 may give the user access and proceed with method 500.

In step 545, security tool 120 receives a second message indicating another action taken by the user. Security tool 120 updates the second profile based on the second message to produce a third profile in step 550. In step 545, security tool 120 generates a third hash based on the third profile. Security tool 120 then calculates a second deviation by comparing the third hash with the first hash in step 560. In step 565, security tool 120 determines whether the second deviation exceeds the threshold. If the second deviation exceeds the threshold, security tool 120 determines that the user is a malicious user and in step 570, security tool 120 flags the user for increased security monitoring and/or denies the user access to certain components of system 100, such as, for example, a building, a network, and/or a software application. If the second deviation does not exceed the threshold, then security tool 120 may give the user access and conclude method 500.

Modifications, additions, or omissions may be made to method 500 depicted in FIG. 5. Method 500 may include more, fewer, or other steps. For example, steps may be performed in parallel or in any suitable order. While discussed as security tool 120 performing the steps, any suitable component of system 100, such as device(s) 110 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
 a memory that stores:
  a first profile indicating actions taken by a user; and
  a first hash indicating expected behavior from the user; and
 a hardware processor communicatively coupled to the memory, wherein the hardware processor:
  receives a first message indicating that the user has attempted to enter a building;
  updates the first profile based on the first message to produce a second profile;
  generates a second hash based on the second profile;
  calculates a first deviation between the second hash and the first hash;
  determines that the first deviation is below a threshold;
  in response to determining that the first deviation is below the threshold, allows the user access to the building;
  receives a second message indicating that the user has requested access to a software application;
  updates the second profile based on the second message to produce a third profile;
  generates a third hash based on the third profile;
  calculates a second deviation between the third hash and the first hash;
  determines that the second deviation is above the threshold; and
  in response to determining that the second deviation is above the threshold:
   flags the user for increased security monitoring; and
   denies the user access to the software application.

2. The apparatus of claim 1, wherein the hardware processor further:
 receives a third message indicating that the user should be granted access to the software application; and
 updates the first hash based on the third message to produce a fourth hash.

3. The apparatus of claim 2, wherein the hardware processor further:
 calculates a third deviation between the third hash and the fourth hash;
 determines that the third deviation is below the threshold; and
 in response to determining that the third deviation is below the threshold, grants the user access to the software application.

4. The apparatus of claim 1, wherein the hardware processor further:
 applies a first weight when updating the first profile based on the first message; and
 applies a second weight different from the first weight when updating the second profile based on the second message.

5. The apparatus of claim 1, wherein the hardware processor further:
 receives a third message indicating that the user has accessed a device;

updates the third profile based on the third message to produce a fourth profile;
generates a fourth hash based on the fourth profile;
calculates a third deviation between the fourth hash and the first hash;
determines that the third deviation is above the threshold; and
in response to determining that the third deviation is above the threshold, prevents the device from connecting to a network.

6. The apparatus of claim 1, wherein the hardware processor further denies the user access to the building in response to determining that the second deviation is above the threshold.

7. The apparatus of claim 1, wherein the hardware processor further updates the first hash based on a message indicating an action taken by a second user different from the first user.

8. A method comprising:
storing, by a memory, a first profile indicating actions taken by a user;
storing, by the memory, a first hash indicating expected behavior from the user;
receiving, by a hardware processor communicatively coupled to the memory, a first message indicating that the user has entered a building;
updating, by the hardware processor, the first profile based on the first message to produce a second profile;
generating, by the processor, a second hash based on the second profile;
calculating, by the processor, a first deviation between the second hash and the first hash;
determining, by the processor, that the first deviation is below a threshold;
receiving, by the processor, a second message indicating that the user has requested access to a software application;
updating, by the processor, the second profile based on the second message to produce a third profile;
generating, by the processor, a third hash based on the third profile;
calculating, by the processor, a second deviation between the third hash and the first hash;
determining, by the processor, that the second deviation is above the threshold; and
in response to determining that the second deviation is above the threshold:
flagging, by the processor, the user for increased security monitoring; and
denying, by the processor, the user access to the software application.

9. The method of claim 8, further comprising:
receiving, by the processor, a third message indicating that the user should be granted access to the building; and
updating, by the processor, the first hash based on the third message to produce a fourth hash.

10. The method of claim 9, further comprising:
calculating, by the processor, a third deviation between the third hash and the fourth hash;
determining, by the processor, that the third deviation is below the threshold; and
in response to determining that the third deviation is below the threshold, granting, by the processor, the user access to the software application.

11. The method of claim 8, further comprising:
applying, by the processor, a first weight when updating the first profile based on the first message; and
applying, by the processor, a second weight different from the first weight when updating the second profile based on the second message.

12. The method of claim 8, further comprising:
receiving, by the processor, a third message indicating that the user has accessed a device;
updating, by the processor, the third profile based on the third message to produce a fourth profile;
generating, by the processor, a fourth hash based on the fourth profile;
calculating, by the processor, a third deviation between the fourth hash and the first hash;
determining, by the processor, that the third deviation is above the threshold; and
in response to determining that the third deviation is above the threshold, preventing, by the processor, the device from connecting to a network.

13. The method of claim 8, further comprising denying, by the processor, the user access to the building in response to determining that the second deviation is above the threshold.

14. The method of claim 8, further comprising updating, by the processor, the first hash based on a message indicating an action taken by a second user different from the first user.

15. A system comprising:
a building; and
a security tool comprising a memory and a hardware processor, wherein the security tool:
stores a first profile indicating actions taken by a user;
stores a first hash indicating expected behavior from the user;
receives a first message indicating that the user has entered the building;
updates the first profile based on the first message to produce a second profile;
generates a second hash based on the second profile;
calculates a first deviation between the second hash and the first hash;
determines that the first deviation is below a threshold;
receives a second message indicating that the user has requested access to a software application;
updates the second profile based on the second message to produce a third profile;
generates a third hash based on the third profile;
calculates a second deviation between the third hash and the first hash;
determines that the second deviation is above the threshold; and
in response to determining that the second deviation is above the threshold:
flags the user for increased security monitoring; and
denies the user access to the software application.

16. The system of claim 15, wherein the security tool further:
receives a third message indicating that the user should be granted access to the building; and
updates the first hash based on the third message to produce a fourth hash.

17. The system of claim 16, wherein the security tool further:
calculates a third deviation between the third hash and the fourth hash;
determines that the third deviation is below the threshold; and in response to determining that the third deviation is below the threshold, grants the user access to the software application.

18. The system of claim 15, wherein the security tool further:
applies a first weight when updating the first profile based on the first message; and
applies a second weight different from the first weight when updating the second profile based on the second message.

19. The system of claim 15, wherein the security tool further:
receives a third message indicating that the user has accessed a device;
updates the third profile based on the third message to produce a fourth profile;
generates a fourth hash based on the fourth profile;
calculates a third deviation between the fourth hash and the first hash;
determines that the third deviation is above the threshold; and
in response to determining that the third deviation is above the threshold, prevents the device from connecting to a network.

20. The system of claim 15, wherein the security tool further denies the user access to the building in response to determining that the second deviation is above the threshold.

* * * * *